PATENTED OCT. 22, 1907.
L. B. CLARK.
MEASURING DEVICE.
APPLICATION FILED JUNE 3, 1907.
2 SHEETS—SHEET 2.
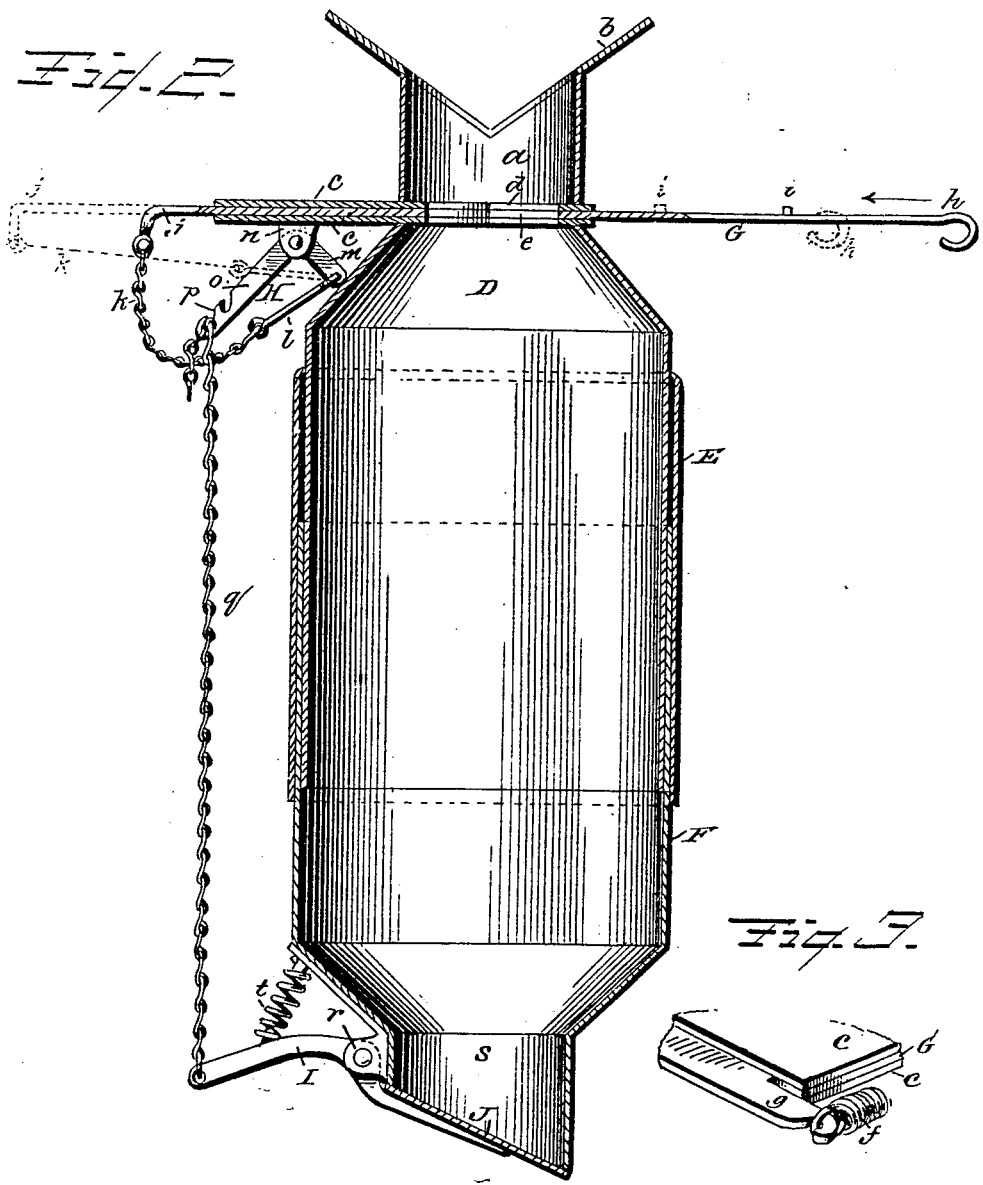
Witnesses
Inventor
Louis B. Clark,
By Chas. H. Fowler
Attorney

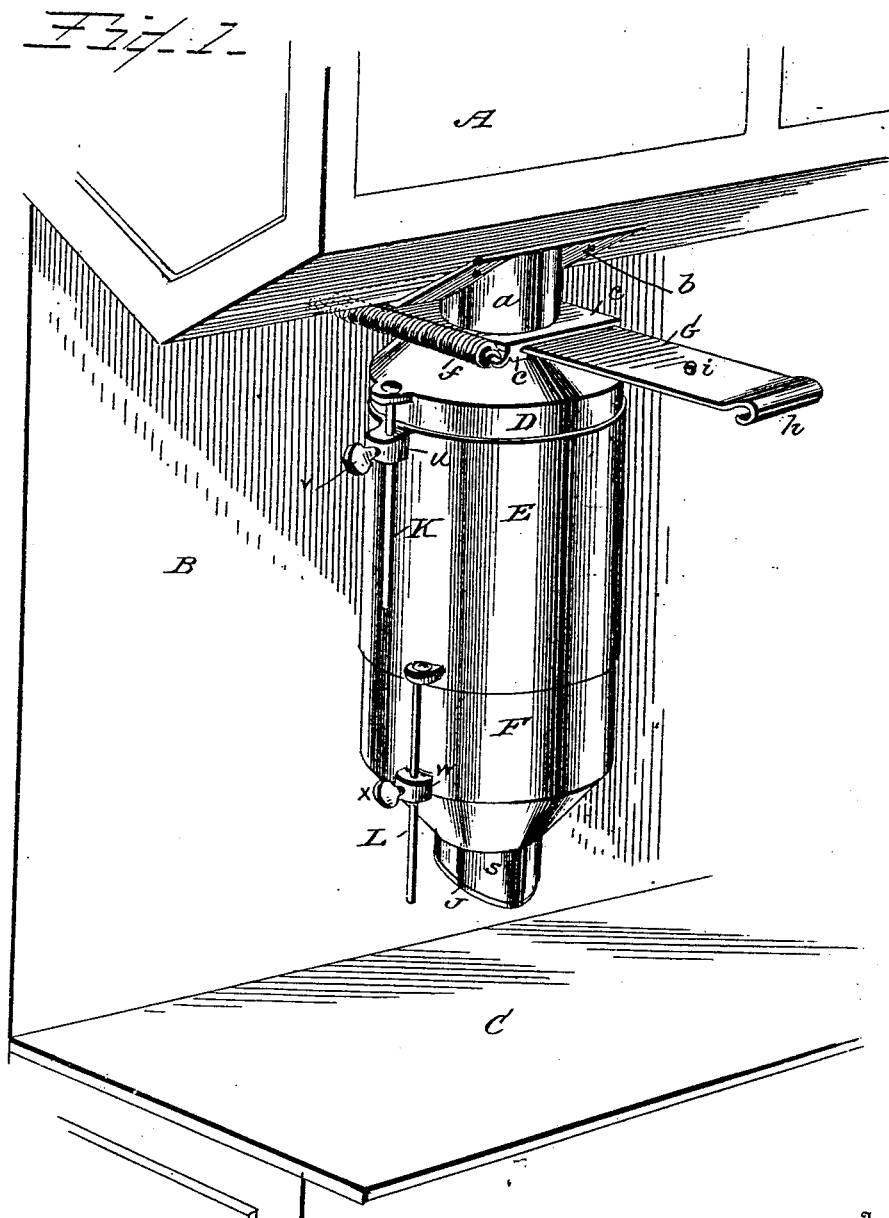

UNITED STATES PATENT OFFICE.

LOUIS B. CLARK, OF OKTAHA, INDIAN TERRITORY.

MEASURING DEVICE.

No. 868,641.

Specification of Letters Patent.

Patented Oct. 22, 1907.

Application filed June 3, 1907. Serial No. 376,937.

*To all whom it may concern:*

Be it known that I, LOUIS B. CLARK, a citizen of the United States, residing at Oktaha, in District 10, Indian Territory, having invented certain new and useful Improvements in Measuring Devices, and do hereby declare that the following is a full, clear, and exact description of the same, reference being had to the annexed drawings, making a part of this specification, and to the letters and figures of reference marked thereon.

The present invention has relation to that class of measuring devices connecting with a series of bins containing coffee, rice, sugar, and all class of grain and like products in which the same is measured as it comes from the bin into the exact quantity desired by adjusting the capacity of the measure.

The invention consists in the several details of construction whereby the measure is materially improved and simplified and its operation rendered easy and successful in its action in measuring the desired quantity required, substantially as shown in the drawings and hereinafter described and claimed.

Figure 1 of the drawings represents a perspective view of my improved measuring device showing it applied to a bin. Fig. 2 a vertical section of the device on an enlarged scale showing the sliding cut-off valve in an open and closed position in full and dotted lines respectively. Fig. 3 a detail perspective view showing a portion of the valve and guide-plates and a portion of the spring connecting with the valve.

In the accompanying drawings, A represents a bin for containing the product to be measured and B the wall and C the counter or platform which may be of any preferred construction found best adapted to the purpose.

The conduit $a$ at the upper end of the measuring device has a plate $b$ for securing it to the under side of the bin, or any means may be employed that will securely attach the conduit to said bin as would be found most convenient, the opening in the bin corresponding to the opening in the conduit.

The main body of the measuring device consists of three sections D, E and F, the former being stationary while the other two are adjustable and may be constructed of metal or other suitable material and are preferably cylindrical and of any suitable size in length and diameter as found most desirable. The stationary section D is at the upper end of the measuring device and between said section and the lower end of the conduit $a$ are two flat guide-plates $c$ between which the cut-off valve G slides to close or open the valve openings $d$ in the guide-plates, the opening $e$ in the valve corresponding in size to the openings in the plates, as shown in Fig. 2 of the drawings.

The cut-off valve G is spring actuated through the medium of a coiled or other suitable spring $f$, one end of which is connected to the plates $c$ and the opposite end to a hooked arm $g$ on the valve, as shown in Figs. 1 and 3 of the drawings. The valve G has a suitable handle $h$ for operating it and a stop $i$ upon its upper side to limit its sliding movement, the normal position of the valve being open as shown in Fig. 2 of the drawings and in closing the valve it is moved in the direction of the arrow and when released the spring will automatically bring the valve back to its normal position. The inner end of the sliding cut-off valve G terminates in a hanger $j$ which extends downwardly and has attached to it a chain or other flexible connection shown at $k$, and through the medium of a rod $l$ connects with the short arm $m$ of a bell-crank lever H which is pivoted to a lug $n$ upon the under side of one of the guide-plates $c$, as shown in Fig. 2 of the drawings.

The long arm $o$ of the bell crank lever H has a plurality of notches $p$ with which engages one end of a chain or other flexible connection as shown at $q$, the opposite or lower end of the chain or flexible connection is attached to a lever I. This lever I is pivoted to a lug or lugs $r$ and carries the disk valve J to which said lever is attached, which valve closes or opens the mouth of the spout $s$ through the action of the sliding cut-off valve G, as will be hereinafter described.

The valve J is spring actuated through the medium of a coiled or other form of spring $t$ which is located between the lever I and the under side of the section F of the body of the measuring device, or may be connected with the lever in any suitable manner found best adapted to the purpose, the means provided for rendering both the valves spring actuated may be modified or changed without departing from the principle of my invention or in any way modifying the action and purpose of the valves. The notches $p$ on the long arm $o$ of the lever H enable the chain or flexible connection $q$ to be adjusted so that the slack therein may be taken up after the body of the measure is adjusted to decrease its length and capacity, as it is necessary that the chain or flexible connection be as taut as possible without holding the lower valve J open.

By the use of two adjustable sections E F a double increased capacity to the measure is obtained with the same facility and ease as where a single adjustable section is used, but it is evident that a single adjustable section may be used in connection with the valves and operating mechanism without departing from the spirit of my invention. One means that may be employed for rendering the movable sections adjustable reside in the upright rods K L, the upper ends of which are connected respectively to the stationary section D and the adjustable section E. The rod K passes down through a guide-nut $u$ projecting from the upper end of the section E, and after the section has been adjusted, it is held in its adjusted position by means of a setscrew $v$ passing through the nut and bearing with frictional contact against the rod, as shown in Fig. 1 of the drawings. The rod L of the adjustable section E passes down through a guide-nut $w$ of the section F and a set-screw $x$ passes through the nut and holds the section in its adjusted position the same as the means shown in connection with section E.

In operation, a sack or other receptacle is placed under the lower valve J and when the sliding cut-off valve G is pushed about two thirds its distance, the valve will cut off at the top of conduit $a$ by closing the opening $d$ in the guide-plates $c$. When the sliding cut-off valve is pushed the remainder of the distance it will open the valve J and allow the contents of the measure to enter the sack or receptacle. When the measure is empty, the operator releases the cut-off valve G and the spring connecting therewith, will automatically force said valve back to its normal position which will open communication between the bin and measure, the valve J being first closed before the cut-off valve is opened. After the cut-off valve is open and the lower valve closed the measure will again fill from the bin and be ready to again operate as hereinbefore described, the automatic action of the lower valve J when the sliding cut-off valve G is operated is obtained by the bell-crank lever H, chains or flexible connections $k$ $q$ and the spring actuated lever I.

Having now fully described my invention, what I claim as new and desire to secure by Letters Patent, is:—

1. In a measuring device, a slidable cut-off valve at the upper end of the measuring device to supply and cut off the product thereof, and a valve at the lower end of the measuring device to enable the contents to be discharged, and means connecting said valve with the cut-off valve comprising a pivoted bell-crank lever, a flexible connection between the lever and the cut-off valve, and a flexible connection between the lever and the valve at the lower end of the measuring device, said flexible connection being adjustable upon the lever, substantially as and for the purpose described.

2. In a measuring device, a body composed of a stationary section and adjustable sections, a conduit communicating with the stationary section, flat guide-plates located between the stationary section and the conduit, a flat slidable spring actuated cut-off valve engaging the guide-plates, a valve at the lower end of the lower adjustable section, means connecting said valve with the cut off valve whereby the same is automatically operated, depending guide-rods upon the stationary section and the upper movable section, and guide-nuts on the movable sections with which the rods engage, and set screws to hold the movable sections in their adjusted position, substantially as and for the purpose set forth.

In testimony whereof I affix my signature in presence of two witnesses.

LOUIS B. CLARK.

Witnesses:
NEIL B. GARDNER,
CHARLES R. FREEMAN.